(12) United States Patent
Stephens et al.

(10) Patent No.: US 11,463,444 B2
(45) Date of Patent: Oct. 4, 2022

(54) CLOUD-BASED PRIVILEGED ACCESS MANAGEMENT

(71) Applicant: Microsoft Technology Licensing, LLC, Redmond, WA (US)

(72) Inventors: Michael Eugene Stephens, Granite Fall, WA (US); Mark David Morowczynski, Seattle, WA (US); Oana Elena Enache, Bellevue, WA (US); Steven Jay Lieberman, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 16/899,324

(22) Filed: Jun. 11, 2020

(65) Prior Publication Data
US 2021/0392142 A1    Dec. 16, 2021

(51) Int. Cl.
*H04L 9/40* (2022.01)
*G06F 21/60* (2013.01)

(52) U.S. Cl.
CPC .......... *H04L 63/104* (2013.01); *G06F 21/604* (2013.01); *H04L 63/08* (2013.01); *H04L 63/105* (2013.01); *G06F 2221/2141* (2013.01)

(58) Field of Classification Search
CPC ..... H04L 63/104; H04L 63/08; H04L 63/105; G06F 21/604; G06F 2221/2141
USPC .......................................................... 726/4
See application file for complete search history.

(56) References Cited

U.S. PATENT DOCUMENTS

| 11,088,993 B2* | 8/2021 | Wardell | H04L 41/5003 |
| 2014/0215136 A1* | 7/2014 | Gole | G06F 3/0656 |
| | | | 711/103 |
| 2015/0277846 A1 | 10/2015 | Yen et al. | |
| 2016/0364600 A1 | 12/2016 | Shah et al. | |

(Continued)

OTHER PUBLICATIONS

Jalili et al., "Cloud bursting galaxy: federated identity and access management" 2019 Published by Oxford University Press, pp. 1-9 (Year: 2019).*

(Continued)

*Primary Examiner* — Khalil Naghdali
(74) *Attorney, Agent, or Firm* — Ogilvie Law Firm

(57) ABSTRACT

A secure cloud-based privileged access management (CB-PAM) service manages on-premise resources. While enrolling an on-premise authentication domain admin group, a secured cloud-based shadow administrating group (SCBSAG) is created; a SCBSAG security identification includes at least part of the enrollee's security identification. The SCBSAG belongs to a clean CBPAM authentication domain which may be secured by defense in depth controls such as time limits on authentication or authorization, password avoidance, least privilege, one-way syncing, and one-way trust. Management via the configured SCBSAG may be fostered by emptying the on-premise admin group, although a break glass account may be kept. CBPAM services direct administrative actions toward on-premise resources through SCBSAGs for cloud tenants, providing secure management control as a service, with broader geographic scope and lower maintenance burdens and costs than privileged access management approaches that are not cloud-based.

20 Claims, 4 Drawing Sheets

(56) References Cited

U.S. PATENT DOCUMENTS

| | | | |
|---|---|---|---|
| 2017/0171214 A1 | 6/2017 | Anderson et al. |
| 2018/0337914 A1 | 11/2018 | Mohamad Abdul et al. |
| 2019/0007415 A1 | 1/2019 | Kliger et al. |
| 2019/0095516 A1 | 3/2019 | Srinivasan et al. |
| 2019/0364020 A1 | 11/2019 | Wardell et al. |
| 2020/0119904 A1 | 4/2020 | Philyaw et al. |

OTHER PUBLICATIONS

Brown et al., 2012 15th International Conference on Network-Based Information Systems, "Multitenancy—Security Risks and Countermeasures", pp. 7-13 (Year: 2012).*

Nichlas Falk, "Privileged Access Workstation", retrieved from <<https://improsec.com/tech-blog/paw>>, Apr. 8, 2019, 14 pages.

"Thycotic Secret Server", retrieved from <<https://thycotic.com/products/secret-server/>>, no later than May 12, 2020, 12 pages.

"Cognizant Privileged Access Management-as-a-Service", retrieved from <<https://www.cognizant.com/Resources/privileged-access-management-as-a-service.pdf»>, 2019, 3 pages.

"Privileged Access Management (PAM)", retrieved from <<https://www.beyondtmst.com/resources/glossary/privileged-access-management-pam>>, no later than May 12, 2020, 20 pages.

Corey O'Connor, "Securing Privileged Access within Microsoft's Enhanced Security Administrative Environments (ESAE)", retrieved from <<https://www.cyberark.com/blog/securing-privileged-access-within-microsofts-enhanced-security-administrative-environments-esae/>>, Jul. 3, 2018, 5 pages.

"Privileged Access Management for Active Directory Domain Services", retrieved from <<https://docs.microsoft.com/en-us/microsoft-identity-manager/pam/privileged-identity-management-for-active-directory-domain-services>>, Aug. 30, 2017, 6 pages.

Nikhil SamratAshok Mittal, "How NOT to use the PAM trust—Leveraging Shadow Principals for Cross Forest Attacks", retrieved from <<http://www.labofapenetrationtester.com/2019/04/abusing-PAM.html>>, Apr. 18, 2019, 7 pages.

"Active Directory administrative tier model", retrieved from <<https://docs.microsoft.com/en-us/windows-server/identity/securing-privileged-access/securing-privileged-access-reference-material>>, Feb. 14, 2019, 32 pages.

"Privileged Access Workstations", retrieved from <<https://docs.microsoft.com/en-us/windows-server/identity/securing-privileged-access/privileged-access-workstations>>, Mar. 13, 2019, 58 pages.

"Azure AD Connect sync service shadow attributes", retrieved from <<https://docs.microsoft.com/en-us/azure/active-directory/hybrid/how-to-connect-syncservice-shadow-attributes>>, Jul. 13, 2017, 3 pages.

"Azure AD Connect sync: Understand and customize synchronization", retrieved from <<https://docs.microsoft.com/en-us/azure/active-directory/hybrid/how-to-connect-sync-whatis>>, Nov. 8, 2017, 4 pages.

Sander Berkouwer, "Ten things you should know about Azure AD Connect and Azure AD Sync", retrieved from <<https://dirteam.com/sander/2015/10/19/ten-things-you-should-know-about-azure-ad-connect-and-azure-ad-sync/>>, Oct. 22, 2015, 10 pages.

"Centrify Competitive Differentiators", retrieved from <<https://www.centrify.com/why-centrify/competitive-differentiators/>>, no later than May 20, 2020, 3 pages.

Jeff Petters, "What is Privileged Access Management (PAM)?", retrieved from <<https://www.varonis.com/blog/privileged-access-management/>>, no later than May 20, 2020, 10 pages.

Carsten, "Windows Server: Clean up Orphaned Foreign Security Principals", retrieved from <<https://blog.foldersecurityviewer.com/windows-server-clean-up-orphaned-foreign-security-principals/>>, Oct. 19, 2018, 7 pages.

"What is FreeIPA?", retrieved from <<https://www.freeipa.org/page/About>>, no later than May 21, 2020, 6 pages.

"Group Policy Object (GPO)", retrieved from <<https://searchwindowsserver.techtarget.com/definition/Group-Policy-Object>>, no later than May 21, 2020, 5 pages.

"Is there any difference between Domain controller and Active directory?", retrieved from <<https://serverfault.com/questions/847946/is-there-any-difference-between-domain-controller-and-active-directory>>, May 3, 2017, 4 pages.

Greg Keller, "Do I Really Need a Domain Controller? It Depends—JumpCloud", retrieved from <<https://jumpcloud.com/blog/do-i-really-need-a-domain-controller#cookie-accept>>, Apr. 1, 2019, 7 pages.

"Linux equivalent to Windows Domain?", retrieved from <<https://www.reddit.com/r/linuxadmin/comments/2bsitr/inux_equivalent_to_windows_domain/>>, 2015, 14 pages.

"Credentials Processes in Windows Authentication", retrieved from <<https://docs.microsoft.com/en-us/windows-server/security/windows-authentication/credentials-processes-in-windows-authentication>>, Oct. 12, 2016, 19 pages.

Vince Lujan, "Group Policy Objects (GPOs) for Linux®", retrieved from <<https://jumpcloud.com/blog/group-policy-objects-gpos-for-linux>>, Mar. 20, 2018, 7 pages.

"International Search Report and Written Opinion Issued in PCT Application No. PCT/US2021/026078", dated Jul. 2, 2021, 13 Pages.

Smith, Russel, "Windows Server 2016: Set up Privileged Access Management", Retrieved From: https://www.petri.com/windows-server-2016-set-privileged-access-management, Oct. 2, 2017, 18 Pages.

* cited by examiner

CLOUD-BASED PRIVILEGED ACCESS MANAGEMENT

BACKGROUND

Attacks on computing systems and the data they contain take many different forms, including some forms which are difficult to predict, and forms which may vary significantly from one situation to another. A wide variety of hardware and software tools may be available in a given situation to improve cybersecurity. For example, detection tools may detect anomalies, rule violations, unexpected behaviors, and other events or conditions that can be investigated by a security analyst. Some tools and techniques aid the investigation of suspicious events in a computing system. Many devices provide forensic data, such as logs that track events of likely interest. Some tools and techniques help reduce vulnerabilities, to make an attack more difficult. Some help decrease damage from an attack, or facilitate repairs after an attack. More generally, depending on the details and risks in a given situation, different tools and techniques may be employed before, during, or after an attack, or in some mix of these periods.

However, attackers continue to create new kinds of attacks and to improve the effectiveness of known attack categories. Accordingly, technical advances that extend or leverage the functionality of existing cybersecurity tools and techniques would be helpful.

SUMMARY

Some embodiments described in this document provide improved technology for privileged access management (PAM), which generally involves managing elevated levels of access to resources in a computing system. In particular, some embodiments facilitate management of on-premise resources using a secure cloud-based PAM service. Some embodiments funnel all normal PAM of a domain's on-premise resources through the cloud-based PAM service, with a fallback option for resource management through an administrative "break glass" account in an emergency when the cloud is not accessible.

Some embodiments use or provide a cloud-based privileged access management (CBPAM) hardware and software combination which includes a digital memory in a cloud and a processor which is in operable communication with the memory. The processor is configured, e.g., by tailored software, to perform CBPAM on behalf of a tenant of the cloud. The CBPAM may include getting an enrollment request. The enrollment request identifies an enrollee group for enrollment in a CBPAM service. The enrollee group belongs to an on-premise authentication domain which includes an on-premise resource. The enrollee group has an enrollee group security identification. The CBPAM may also include creating a secured cloud-based shadow administrating group (SCBSAG) which has a SCBSAG security identification that includes at least a portion of the enrollee group security identification. The SCBSAG belongs to a CBPAM authentication domain which is not the on-premise authentication domain. The CBPAM may also include directing an administrative action toward the on-premise resource through the SCBSAG on behalf of the tenant and based at least in part on at least a portion of the enrollee group security identification. In this manner, the embodiment is configured to provide secure management control of the on-premise resource from the cloud as a service to the cloud tenant.

Some embodiments use or provide steps for providing a cloud-based privileged access management (CBPAM) service for an on-premise resource. The steps may include getting an enrollment request, the enrollment request identifying an enrollee group for enrollment in the CBPAM service, the enrollee group belonging to an on-premise authentication domain which includes the on-premise resource, the enrollee group having an enrollee group security identification; creating a secured cloud-based shadow administrating group (SCBSAG) which has a SCBSAG security identification that includes at least a portion of the enrollee group security identification, the SCBSAG belonging to a CBPAM authentication domain which is not the on-premise authentication domain; and directing an administrative action toward the on-premise resource through the SCBSAG based at least in part on at least a portion of the enrollee group security identification.

Some embodiments use or provide a computer-readable storage medium configured with data and instructions, or use other computing items, which upon execution by a processor cause a computing system to perform a method for providing a cloud-based privileged access management (CBPAM) service for an on-premise resource. In particular, some embodiments get an enrollment request. The enrollment request identifies an enrollee group for enrollment in the CBPAM service. The enrollee group belongs to an on-premise authentication domain which includes the on-premise resource, and the enrollee group has an enrollee group security identification. The embodiment also creates a secured cloud-based shadow administrating group (SCBSAG) which has a SCBSAG security identification that includes at least a portion of the enrollee group security identification. The SCBSAG belongs to a CBPAM authentication domain which is not the on-premise authentication domain. The embodiment also makes an administrative user account in the SCBSAG, and then directs an administrative action from the administrative user account toward the on-premise resource. In this way, the embodiment provides secure management control of the on-premise resource from the administrative user account in the cloud.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
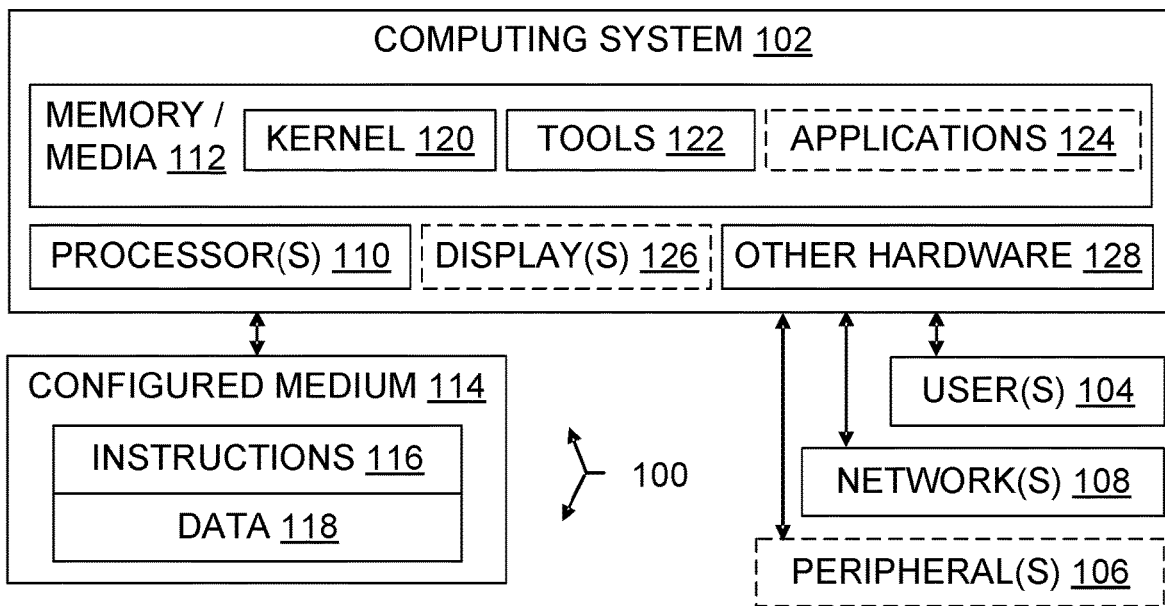
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by Microsoft innovators who were working to improve the feature set, security, and usability of Microsoft cloud service offerings, including some versions of Azure® cloud storage offerings, cloud-connected application software offerings such as Office 365® services, and Azure® cloud computing offerings (marks of Microsoft Corporation). Alternatives or improvements to Microsoft Enhanced Security Administrative Environment™ (ESAE) offerings were also sought.

In particular, a technical challenge was to how to give administrators appropriate elevated access to on-premise resources of an authentication domain, without imposing privileged access management technology set-up and maintenance requirements that translate into costs up to several million US dollars for a large enterprise. Other technical challenges are also addressed by teachings herein. For example, some challenges addressed herein are how to secure a group of administrative accounts, how to define "secure" in the context of privileged access management, how to provide privileged access management that is primarily cloud-based, how to restrict administrative access based on policy criteria such as approvals or access durations, how to integrate trust relationships into privileged access management, and how to integrate cloud directory synchronization into privileged access management. One of skill will recognize these and other technical challenges as they are addressed at various points within the present disclosure.

By enhancing, recombining, leveraging, and in some cases avoiding existing privileged access management (PAM) functionalities, and adding new functionalities, various embodiments are obtained, as described herein for the understanding of one of skill in the art. In response to a request to enroll a group or a domain in cloud-based PAM, one or more secure cloud shadow groups is created. An authentication and authorization workflow then funnels PAM activities through the secure cloud shadow groups, which permits cost-effective and efficient management of on-premise resources as a cloud-based service.

In some embodiments, a secure cloud shadow group is secure in one or more of the following ways: it is created by a trusted source, is not accessible by password (or only accessible by complex passwords), is not compromised by unauthorized access, is configured to conform with least privilege, is protected by defense-in-depth, is used only for elevated privilege operations and used only by authorized administrators, and so on.

In some embodiments, a secure cloud shadow group is a shadow in that its security identification includes a copy of the security identification of the group or domain being enrolled in cloud-based PAM, or its only member identities are copies of identities in the group or domain being enrolled in cloud-based PAM, or both.

A secure cloud shadow group is a cloud artifact. As such, in some embodiments it can provide or benefit from cloud characteristics such as security, availability, well-defined and controlled access via an API or portal, low end-user maintenance burdens, geographic breadth, automatic backup, and integration with cloud-based service offerings.

Other aspects of these embodiments, and other privileged access management functionality enhancement embodiments, are also described herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud or enterprise network. In particular, enhanced privileged access management functionality could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

Figure 2:
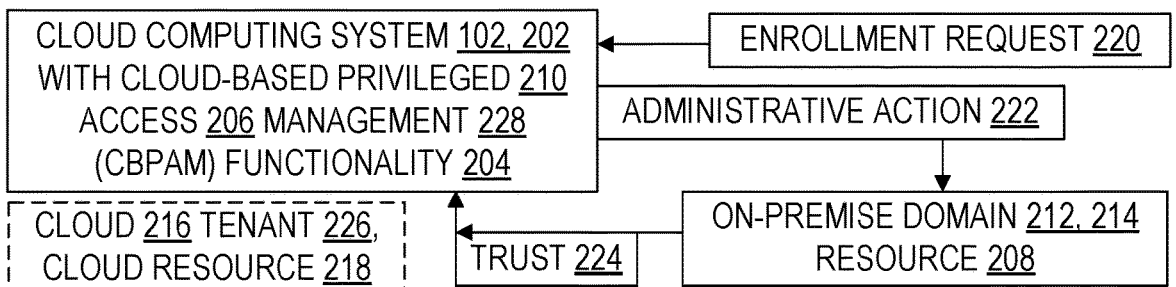
FIG. 2 is a block diagram illustrating a cloud computing system equipped with privileged access management functionality for administrative control of an on-premise resource, and some aspects of a surrounding context.

FIG. 2 illustrates an environment having an enhanced system 202, 102 that includes privileged access management functionality 204. In particular, the illustrated system 202 includes enhanced functionality for security or operational management 228 that helps authorized administrators access 206 a resource 208, when that access requires or benefits from some level of privilege 210 above the lowest level granted in a given system. The criteria for treating resource access 206 as privileged 210, and the precise scope of privilege 210, may vary from one resource 208 to another, one user account to another, one organization to another, one part of an organization to another, and over time, for example, but the teachings herein may be beneficially applied to enhance privileged access management despite such variations.

In the illustrated environment, the resource 208 is located within an on-premise domain 212, which is an example of an authentication domain 214. As used here, "on-premise" means "not in a cloud" 216. A given authentication domain 214 may span only on-premise (off-cloud) resources, or it may span only cloud resources 218, for example. However, a hybrid authentication domain 214 may include both on-premise resources 208 and cloud resources 218.

In the illustrated environment, the on-premise authentication domain 212, or a group belonging to that domain 212, has been enrolled in cloud-based PAM in response to an enrollment request 220. The enrollment makes the resource 208 available to the cloud-based PAM functionality 204 as a prospective target of an administrative action 222. That is, the resource 208 can be read, modified, deleted, moved, or otherwise accessed by an administrative action 222 via the cloud-based PAM functionality 204; the access 206 is subject to a cloud tenant's 226 authentication and authorization requirements, which are enforced at least in part through the cloud-based PAM functionality 204. The on-premise authentication domain 212 shown is in a trust relationship 224 with the cloud-based PAM functionality 204, or with at least a portion thereof, such that the on-premise authentication domain 212 is a trusting entity and the cloud-based PAM functionality 204 or a portion thereof is a trusted entity.

As additional context, attackers (not shown) who seek to damage or destroy the confidentiality of data 118 or other resources 208 may reside outside an on-premise network 108 boundary that is defined, e.g., by firewalls. But teachings herein may also be advantageously applied to help manage privileged access in order to prevent or mitigate attacks that are perpetrated by insider attackers. Similarly, the system 202 may communicate with a separately located cybersecurity center (not shown), while in other environments an enhanced system 202 resides inside the cybersecurity center, and in still others the enhanced system 202 operates without any cybersecurity center per se.

Figure 3:
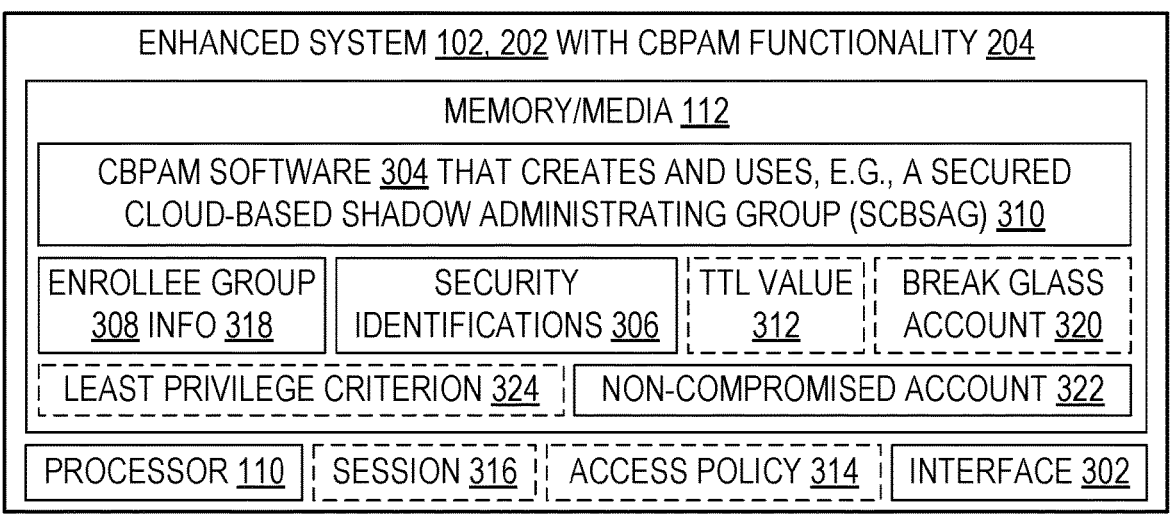
FIG. 3 is a block diagram illustrating an enhanced computing system with cloud-based privileged access management (CBPAM) functionality.

FIG. 3 illustrates an enhanced system 202 which is configured with cloud-based privileged access management (CBPAM) functionality 204. The illustrated system 202 includes or resides within a cloud 216. The system 202 includes or accesses functionality for networked communication with one or more on-premise resources 208. In some embodiments the system 202 communicates directly with a resource 208, e.g., resources 208 may include cloud-connected but otherwise isolated IoT devices, or be located in a distributed system such as a managed blockchain environment. In some embodiments, the system 202 also or instead communicates with a resource 208 via an on-premise network 108. The system 202 may include or communicate with zero or more additional clouds, and communicate with other computing devices, through one or more interfaces 302. An interface 302 may include hardware such as network interface cards, software such as network stacks, APIs, or sockets, combination items such as network connections, or a combination thereof.

The illustrated system 202 includes CBPAM software 304 which configures the system to perform computations that may include parsing an enrollment request 220, copying a security identification 306 of a group 308 identified in the enrollment request 220, creating a secure shadow group 310, reading data values 118 from a policy data structure 314, setting a time-to-live (TTL) value 312, receiving digital descriptions of administrative actions 222, and starting, using, and ending communication sessions 316 that transfer digital data electronically, for example, as well as other computing operations that one of skill would understand to occur, consistent with the teachings presented herein. In particular, the CBPAM software 304 may perform one, some, or all of the data flow steps illustrated in FIG. 4, and may perform one, some, or all of the PAM service steps illustrated in one or more of FIGS. 5 and 6.

FIG. 3 also shows additional items, such as enrollee group info 318, a break glass account 320, a non-compromised account 322, and a least privilege criterion 324. These items are discussed at various points herein, and additional details regarding them are provided in the discussion of a List of Reference Numerals later in this disclosure document.

Figure 4:
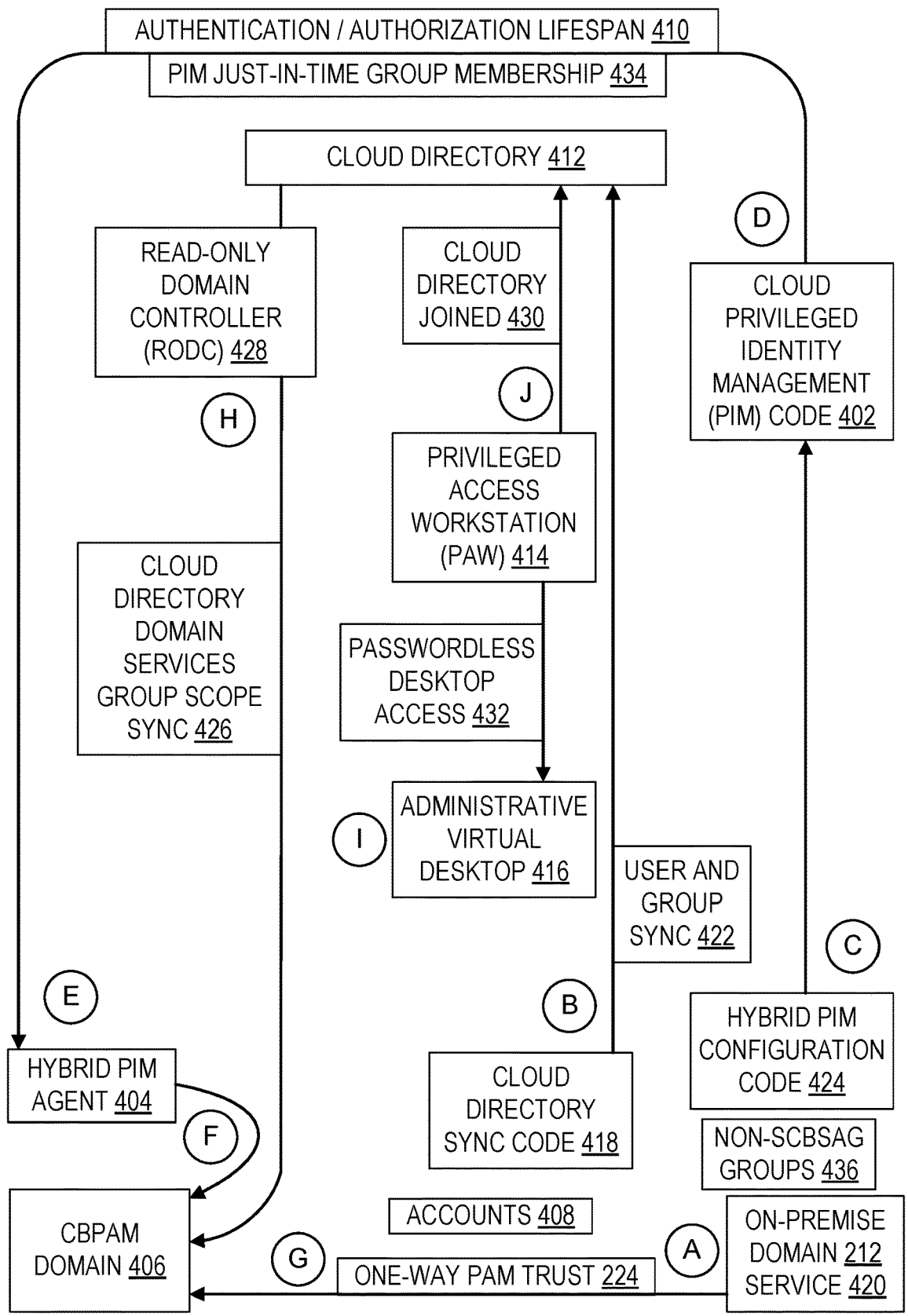
FIG. 4 is a data flow diagram illustrating some aspects of some architectures for cloud-based privileged access management.

FIG. 4 illustrates some aspects of a particular family of CBPAM architectures. These architectures are discussed below after an overview of systems, processes, and configured storage media. Some of the illustrated items are also discussed elsewhere herein, and additional details regarding items are provided in the discussion of a List of Reference Numerals later in this disclosure document.

With reference now to all of the drawing figures, some embodiments use or provide a functionality-enhanced system, such as system 202 or another system 102 that is enhanced as taught herein. Some embodiments get an enrollment request 220, create a shadow group 310 using the same security ID 306 as the group 308 being enrolled, and then make the shadow group available for use in managing an on-prem resource 208.

In some embodiments, the request 220 getting step is a generalization of callout C in FIG. 4. As noted elsewhere herein, callout C involves collecting SID info 306, 318 about the group 308 to be enrolled in CBPAM, and sending the info 306, 318 to a privileged identity management (PIM) code 402, e.g., code for an Azure® Hybrid PIM public endpoint (mark of Microsoft Corporation).

In some embodiments, the shadow group 310 creating step is a generalization of parts of callouts D, E, F in FIG. 4. For instance, in an example implementation, an Azure® PIM code 402 creates an internal representation 310 of the group 308 that is being enrolled; the internal representation 310 equates to a hybrid privilege level. A Hybrid PIM agent 404 gets configuration changes and creates the proper shadow principal container 310 in a bastion forest 406 using the SID 306 of the newly enrolled domain 212. A bastion forest 406 is an example of a CBPAM domain 406. An identity is sometimes called a "principal" in security or identity management contexts. Identities may be implemented via user accounts, user profiles, or similar data structures.

In some embodiments, only users in the CBPAM domain 406 can administratively manage resources in the on-premises domain 212; the CBPAM domain 406 may also be referred to as the "admin domain". In some embodiments, after the admin domain is set up and its operation has been verified, all domain admins are removed from admin groups in the on-prem domain 212, thereby forcing all admin access done in the on-prem domain to go through the admin domain 406. Admins sign into the admin domain, then cross over to the on-prem domain to do admin work there.

In some embodiments, the shadow group 310 is used in managing the on-prem resource 208 by directing an administrative action 222 toward the on-prem resource 208 from the shadow group 310. In some, this directing step is a generalization of parts of callouts G-J in FIG. 4 and the Potential Resource Management Workflow discussed herein. An identity in the bastion forest 406 can manage a resource 208 in the enrolled domain 212 on prem, e.g., by using some mixture of one-way trust 224, Kerberos, a virtual admin desktop 416, PAW 414 or SAW 414, and so on.

More generally, features such as cloud shadow groups 310, matching security identifications 306, TTL values generally, and others described herein or known previously, may be compatible with usage by or in an enhanced system 202, with suitable adaptations discussed herein or otherwise within the reach of one of skill informed by the present disclosure. Cloud-based privileged identity management code may be adapted, for example, for use in architectures such as those illustrated by FIG. 4 and otherwise as taught herein.

In some embodiments, a system which is configured for cloud-based privileged access management (CBPAM) includes a digital memory 112 in a cloud 216, and a processor 110 in operable communication with the memory. The processor 110 is configured to perform CBPAM steps on behalf of a tenant 226 of the cloud 216. The steps may include (a) getting an enrollment request 220, the enrollment request identifying an enrollee group 308 for enrollment in a CBPAM service 616, the enrollee group belonging to an on-premise authentication domain 212 which includes an on-premise resource 208, the enrollee group having an enrollee group security identification 306, (b) creating a secured cloud-based shadow administrating group (SCBSAG) 310 which has a SCBSAG security identification 306 that includes at least a portion of the enrollee group security identification 306, the SCBSAG 310 belonging to a CBPAM authentication domain 406 which is not the on-premise authentication domain 212, and (c) directing an administrative action 222 toward the on-premise resource 208 through the SCBSAG 310 on behalf of the tenant 226 and based at least in part on at least a portion of the enrollee group security identification 306. Thus, the system 202 is configured to provide secure management control of the on-premise resource 208 from the cloud 216 as a service to the cloud tenant 226.

With regard to the SCBSAG security identification 306 including at least a portion of the enrollee group security identification 306, note that the two security identifications 306 can be identical but may also be non-identical. For instance, one hypothetical implementation includes timestamps with SIDs, e.g., a SCBSAG SID is 1234-500-27052020 and an enrollee group SID is 1234-500-01012020. Even though these values are not identical, the portions of the SIDs that matter for security identification are identical ("1234-500"), so the SCBSAG security identification 306 does include at least a portion of the enrollee group security identification 306.

In some embodiments, the CBPAM authentication domain 406 has a CBPAM authentication domain security identification 306 which is embedded in the SCBSAG security identification 306. Embedding may help provide an efficient implementation, e.g., when a security identification 306 is digitally implemented as a string or an integer or as a set of strings or integers. For instance, domain SIDs may be embedded 610 in group SIDs, e.g., a hypothetical Domain Z SecurityID of 1234 is embedded in an admin group hypothetical SecurityID of 1234-500.

In some embodiments, no user account 408 of the CBPAM authentication domain 406 is compromised and no user account 408 of the SCBSAG 310 is compromised. In other words, all of the CBPAM authentication domain 406 user accounts 408 are non-compromised accounts 322, and all of the SCBSAG 310 user accounts 408 are non-compromised accounts 322. More generally, in a given embodiment, non-compromised accounts 322 may be a characteristic of the CBPAM authentication domain 406 (which may be, e.g., a bastion domain), or be a characteristic of the SCBSAG 310, or both.

In some embodiments, all user accounts 408 of the CBPAM authentication domain 406 conform with a least privilege criterion 324 and all user accounts 408 of the SCBSAG 310 also conform with the least privilege criterion 324. Despite the prudence of conforming with a least privilege criterion, some tenants or users may intentionally or unwittingly violate such a criterion. However, in a given embodiment, conformance with least privilege may be a characteristic of all the CBPAM authentication domain 406 accounts, a characteristic of all the SCBSAG 310 accounts, or both.

In some embodiments, the CBPAM authentication domain 406 has a break glass account 320 which is configured to provide emergency secure management control of the on-premise resource 208 without use of the SCBSAG 310. For example, a break glass account 320 may be accessible using a complex password that is stored in a physically secure vault that is located on-premise, or in a vault located at a remote site such as a disaster recovery site or a business continuity site, or the break glass account 320 password may be stored in a hardware security module.

Other system embodiments are also described herein, either directly or derivable as system versions of described processes or configured media, duly informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, account categories, security mechanisms, operation sequences, data structures, or functionalities for instance, and may otherwise depart from the examples provided herein.

Processes (a.k.a. Methods)

Figure 5:
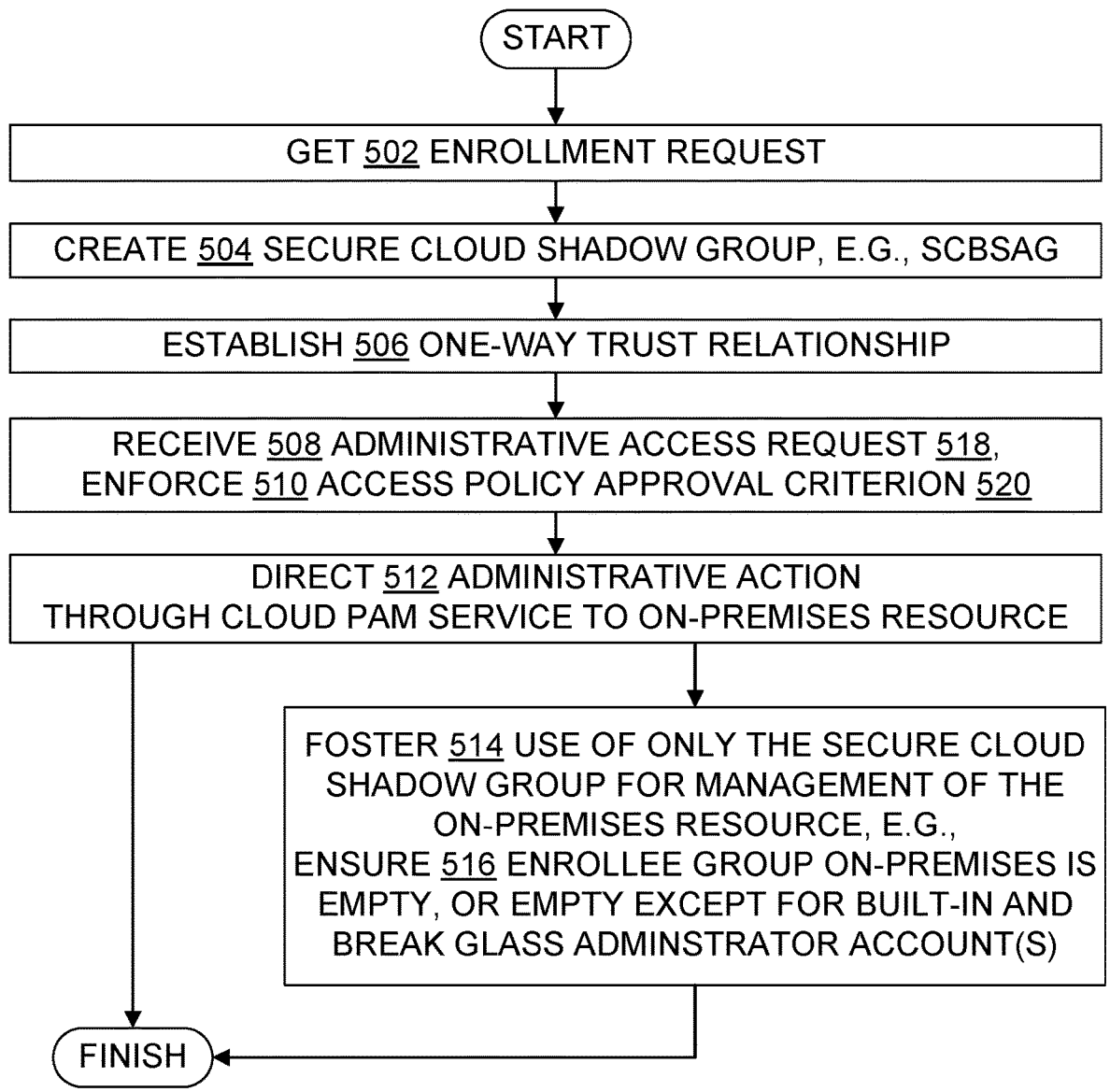
FIG. 5 is a flowchart illustrating steps in some CBPAM service methods.
Figure 6:
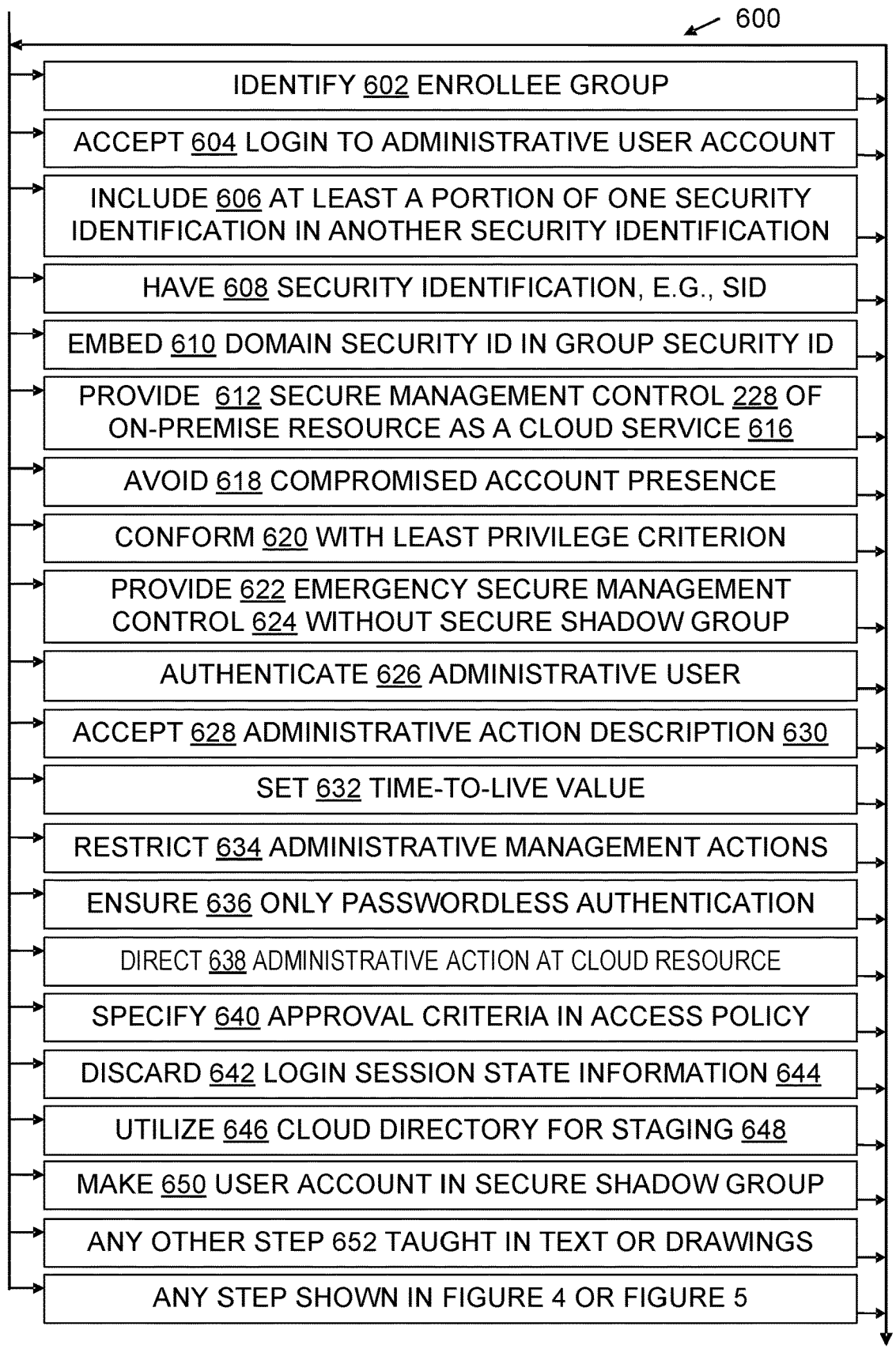
FIG. 6 is a flowchart further illustrating steps in some CBPAM service methods.

FIG. 5 illustrates a family of privileged access management service methods 500 that may be performed or assisted by an enhanced system, such as system 202 or another functionality 204 enhanced system as taught herein. FIG. 6 further illustrates privileged access management service methods (which may also be referred to as "processes" in the legal sense of that word) that are suitable for use during operation of a system which has innovative functionality taught herein. FIG. 6 includes some refinements, supplements, or contextual actions for steps shown in FIG. 5, as well as methods which do not necessarily involve steps of FIG. 5. FIG. 6 as a whole does incorporate all steps shown or implied in FIGS. 4 and 5, as steps that may be part of a particular embodiment.

Technical processes shown in the Figures or otherwise disclosed will be performed automatically, e.g., by an enhanced system 202 or software component thereof, unless otherwise indicated. Processes may also be performed in part automatically and in part manually to the extent activity by a human person is implicated. For example, in some situations, by entering a command to enroll a specified group 308 in a CBPAM service, a human end user triggers the computational creation of a SCBSAG 310. However, no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 5 and 6. Steps may be performed serially, in a partially overlapping manner, or fully in parallel. In particular, the order in which flowchart 500 or flowchart 600 operation items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments perform steps on behalf of a cloud tenant 226. However, cloud tenancy is not a prerequisite of every embodiment.

Some embodiments use or provide a method for providing a cloud-based privileged access management (CBPAM) service 616 for an on-premise resource 208, including the following automatic steps: getting 502 an enrollment request 220, the enrollment request identifying 602 an enrollee group 308 for enrollment in the CBPAM service, the enrollee group belonging to an on-premise authentication domain 212 which includes the on-premise resource, the enrollee group having 608 an enrollee group security identification 306; creating 504 a secured cloud-based shadow administrating group (SCBSAG) 310 which has a SCBSAG security identification 306 that includes 606 at least a portion of the enrollee group security identification 306, the SCBSAG belonging to a CBPAM authentication domain 406 which is not the on-premise authentication domain; and directing 512 an administrative action 222 toward the on-premise resource through the SCBSAG based at least in part on at least a portion of the enrollee group security identification 306.

In some embodiments, the method includes establishing 506 a one-way trust relationship 224 having the CBPAM authentication domain 406 as a trusted entity and having the on-premise authentication domain 212 as a trusting entity. This is illustrated in callout A in FIG. 4.

In some embodiments, the method includes authenticating 626 an administrative user 104 to the SCBSAG 310, and accepting 628 a description 630 of the administrative action from the authenticated administrative user before directing 512 the administrative action toward the on-premise resource. This may be part of a workflow consistent with the Potential Resource Management Workflow discussed herein. During the workflow, the enhanced system authenticates an admin 104 to the cloud shadow admin group 310, and then lets the admin manage 612 the on-prem resource 208 through the cloud shadow admin group 310.

Some embodiments add a TTL constraint 312 to the admin user's authentication or the admin user's authorization, or to both. Thus, in some embodiments the method includes setting 632 a time-to-live value 312 for at least one of the following: an authentication lifespan 410 of the administrative user 104 after which the administrative user will no longer be treated as authenticated to the SCBSAG 310, or an authorization lifespan 410 of the administrative action after which the administrative action will no longer be treated as authorized.

Some embodiments include a prudent step of emptying the on-prem admin group so that admin actions 222 must go through the cloud shadow admin group 310. In some, only users 104 in the cloud admin domain 406 can manage the on-prem domain 212. In some embodiments the method includes at least one of the following: ensuring 516 that the enrollee group 308 does not contain any members, thereby fostering 514 use of only the SCBSAG 310 for administrative management of the on-premise resource 208; or restricting 634 administrative management of the on-premise authentication domain 212 to administrative actions 222 which are directed 512 from the SCBSAG 310.

Embodiments may be compatible with various defense-in-depth options that help makes the CBPAM service 616 more secure. Some of these options may include conformance with least privilege, avoidance of compromised accounts, auditing of access requests, and avoidance of password usage for authentication. In particular, in some embodiments the method includes ensuring 636 that each successful authentication to at least one of the following is a passwordless authentication: the CBPAM authentication domain 406, or the SCBSAG 310.

Some embodiments provide administrative users 104 with a capability to manage both on-prem resources 208 and cloud resources 218 through a CBPAM service 616. For example, in an environment which has CBPAM service from an Azure® cloud configured with Active Directory® functionality, a secure administrative virtual desktop 416 operating via a CBPAM service 616 can be used to manage either Azure® Active Directory® resources 218 or on-premises Active Directory® resources 208, as the administrative user will have been authenticated to both directory subsystems (marks of Microsoft Corporation). More generally, in some embodiments the method includes directing 638 an administrative action 222 toward a cloud resource 218 through the SCBSAG.

In some embodiments the method includes receiving 508 an access request 518 which requests privileged access to the on-premise resource 208, and enforcing 510 an access policy 314 against the request. In some embodiments, the access policy specifies 640 at least one of the following approval criteria 520: how many approvals are required for the access request to be granted, a particular approval that is required for the access request to be granted, a level of approval that is required for the access request to be granted, or a time within which an approval is required for the access request to be granted.

In some embodiments the method includes directing 512 the administrative action 222 toward the on-premise resource through the SCBSAG within a login session 316 having state information 644. The session 316 state information 644 includes a session key, an access credential, or both. The method discards 642 the state information when the login session ends, e.g., by overwriting memory 112 containing the state information. This provides additional security in the CBPAM service.

Some embodiments implement the CBPAM service using an LDAP-compatible or LDAP-derived directory of identities, or another identity directory. Microsoft Active Directory® solutions include examples of identity directories (mark of Microsoft Corporation). In some embodiment, the method includes utilizing 646 a directory as an intermediate storage location (staging 648) a security identification 306 of a member of the enrollee group 308, the directory being managed by a cloud-based identity management service. In particular, FIG. 4 illustrates CBPAM architectures which utilize 646 a cloud directory 412 as an intermediate storage location for a security identification 306 of a member of the enrollee group 308, the cloud directory 412 being managed by a cloud-based identity management service 402.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as CBPAM software 304, secure cloud shadow admin groups 310, security IDs 306, TTL values 312, access policy data structures 314, enrollment request data structures 220, trust relationships 224 between authentication domains 214, and cloud directories 412, in the form of data 118 and instructions 116, read from a removable storage medium 114 and/or another source such as a network connection, to form a configured storage medium. The configured storage medium 112 is capable of causing a computer system 102 to perform technical process steps for cloud-based privileged access management of on-premise resources and related functionalities, as disclosed herein. The Figures thus help illustrate configured storage media embodiments and process (a.k.a. method) embodiments, as well as system and process embodiments. In particular, any of the process steps illustrated in FIG. 4, 5, or 6, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a method for providing a cloud-based privileged access management (CBPAM) service for an on-premise resource.

This method includes getting 502 an enrollment request 220. The enrollment request identifies 602 an enrollee group 308 for enrollment in the CBPAM service. The enrollee group belongs to an on-premise authentication domain 212 which includes the on-premise resource. The enrollee group has an enrollee group security identification 306.

This method also includes creating 504 a secured cloud-based shadow administrating group (SCBSAG) 310 which has a SCBSAG security identification 306 that includes at least a portion of the enrollee group security identification 306. The SCBSAG belongs to a CBPAM authentication domain 406 which is not the on-premise authentication domain 212.

This method also includes making 650 an administrative user account 408 in the SCBSAG 310. In addition, this method includes directing 512 an administrative action 222 from the administrative user account toward the on-premise resource 208. In summary, this method provides 612 secure management control 228 of the on-premise resource 208 from the administrative user account 408 in the cloud 216.

In some embodiments, the method includes fostering 514 use of only the SCBSAG for administrative management of the on-premise resource, by ensuring 516 that the enrollee group does not contain any user account that is not one of the following: a built-in administrator account, or a break glass account 320 which is configured to provide emergency secure management control of the on-premise resource.

In some embodiments, the method includes restricting 634 administrative management of the on-premise resource 208 to implement only administrative actions which are directed from the SCBSAG. Some embodiments also allow administrative actions which are directed from the break glass account.

In some embodiments, the method includes verifying 510 that the administrative action 222 or the administrative user account 408 or both of them satisfy an access policy 314 which requires multiple approvals, with the verifying performed before directing 512 the administrative action toward the on-premise resource.

In some embodiments, the method includes accepting 604 a login to the administrative user account 408 from at least one of the following: an administrative virtual desktop 416, a privileged access workstation 414 owned by a cloud tenant 226, or a privileged access workstation 414 leased to a cloud tenant 226.

ADDITIONAL EXAMPLES AND OBSERVATIONS

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

In general terms, protecting administrative access within computing systems may be an important aspect of enterprise security. However, the details of how such protection is attempted or achieved may vary widely. Consequently, accomplishing full and correct implementation of a security recommendation may be difficult, even for larger entities. Implementing security recommendations may also be extremely costly, ranging up to several million dollars for a large enterprise. Moreover, if on-going maintenance of a complex security implementation is incorrect, or is neglected, an entity can have a false sense of security about the actual risks in an environment.

FIG. 4 CBPAM Architectures

A cloud-based privileged access workstation may leverage cloud technologies to greatly improve an entity's admin security posture, making secure PAM accessible as a cloud subscription and removing the burden of ongoing management of an existing security solution. Some solutions combine or adapt existing technologies, such as cloud directory sync code 418 (e.g., Azure® Active Directory® Connect code), cloud privileged identity management code 402 (e.g., Azure® Active Directory® Privileged Identity Management (PIM) code), domain 214 service code (e.g., Azure® Active Directory® Domain Services code), and cloud-based device management code 416 (e.g., Microsoft Managed Desktop (MMD) code) (marks of Microsoft Corporation). For instance, cloud directory sync code 418 may be used to synchronize identities and other objects between a customer's on-premises environment and their cloud directory instance 412. Also, cloud privileged identity management code 402 may be used to activate identities into roles and groups.

Note that although Microsoft product or service offerings are given as examples within the present disclosure, the teachings presented herein are not limited to environments that include these Microsoft offerings. Some possible architectures are described herein, including some which have been considered internally under the Microsoft working name Project Husky. FIG. 4 and aspects of its textual description are derived from internal Project Husky information.

FIG. 4 illustrates some CBPAM architectures that leverage cloud technologies to improve admin security by making it more easily accessible as a cloud subscription and by removing the burden of ongoing management of an existing security solution. Aspects of FIG. 4 are discussed at various locations throughout the current disclosure, and in particular items marked by circled letter callouts are discussed below.

Trademarks and service marks noted in the FIG. 4 discussion are marks of Microsoft Corporation unless indicated otherwise.

Callout A. One solution starts with a hybrid corporate environment, that is, an environment that has both on-premise and cloud components. In particular, in this example the customer has an on-premises domain 212 service 420 (e.g., Active Directory® Domain Services), and the customer also has a cloud tenant 226 (e.g., an Azure® Active Directory® tenant 226).

Callout B. The customer synchronizes 422 non-privileged users and non-privileged groups (e.g., by syncing password hashes) to a cloud directory 412 (e.g., an Azure® Active Directory® database) using sync code 418 (e.g., Azure® Active Directory® Connect). As used here, "non-privileged" does not mean zero privileges (which would prevent any work from being done) but instead indicates a lack of elevated or administrator-level privilege of the type that is subject to PAM in the environment in question.

Callout C. The customer runs a CB PIM configuration program 424 (a.k.a. "Hybrid PIM Configuration") in the domain 212 that will be enrolled for Hybrid PIM (as an aspect of CBPAM). The Hybrid PIM Configuration application 424 collects SID 306 information about the groups 308 the customer wants to enroll in Hybrid PIM. This is where the domain admin in fabtoso.com provisions the domain to Azure® PIM, for example, and selects the groups that will have a group shadow principal created for them in the Azure® environment. This information is also used by Azure® PIM to present a workflow for the user to request access to one or more of the group shadow principals, and for others of privilege to grant access in response to the request. Optionally, the application 424 can perform licensing functions for the domain 212. The collected information is securely transmitted (e.g., outbound on port 443) to a Hybrid PIM endpoint 402 (e.g., an Azure® Hybrid PIM public endpoint). The Hybrid PIM application 424 in this example only runs to enroll new domains 212 or to change the domain configuration that is uploaded to the Hybrid PIM endpoint. Enrolling a domain 212 enrolls the groups of that domain.

Callout D. The customer's tenant 226 running PIM receives the Hybrid PIM domain 212 registration and the group SIDs 306 that should be enrolled in Hybrid PIM. Cloud PIM code 402 creates an internal representation 310 of these groups that equate to a hybrid privilege level. For example, Contoso.com Domain Admins 104 might be represented as contoso_DA, and Fabrikam's Account Operators group might be represented as Fabrikam_AO. (Contoso and Fabrikam are hypothetical entities used for the sake of this example.) These internal representations 310 are not strictly speaking cloud groups (although they may be referred to informally as such when context is clear) because the point of privilege management is a secure shadow group 310 (e.g., one in an Azure® AD Bastion Forest). Cloud PIM code 402 queues the recently enrolled domain SIDs and group SIDS in an agent queue of an agent 404.

In some embodiments, the internal representations 310 and their respective secure shadow group 310 are separate data structures, but they are closely tied to one another functionally and coexist during their effective lives, so the same reference numeral 310 is applied to both of them. In other embodiments, the secure shadow groups 310 serve as the internal representations 310.

Callout E. A service, implemented with a Hybrid PIM agent 404, runs on an adapted cloud domain service 420 (e.g., a new SKU of Azure® AD Domain Services, namely, a Bastion Forest SKU). The Hybrid PIM agent 404 gets configuration changes (e.g., through an outbound channel across the Azure® private network). This is when Azure® PIM, for example, creates a shadow principal object in the bastion forest (if it does not exist) and adds the user from the bastion forest as a member of the shadow principal.

In this example, a shadow security principal is an object representing a user, group or computer account from another forest. To use such a principal in another forest to access resources, a PAM trust relation is established. Shadow security principals are not to be confused with shadow groups, a term sometimes used for groups representing all users in an organizational unit (OU).

Callout F. The Hybrid PIM agent 404 creates 504 the proper shadow principal container (group) 310 in the CBPAM domain 406 (e.g., Bastion Forest) using the SIDs 306 from the newly enrolled domain 212. The CBPAM domain 406 performs a one-way sync 426 of cloud users including only the user accounts 408 that are part of the Hybrid PIM Admins cloud group 310, as identities in the CBPAM domain.

Callout G. The CBPAM domain 406 has a one-way Privileged Access Management (PAM) enabled trust 224 with the newly enrolled domain 212. The one-way trust allows identities in the CBPAM domain 406 to manage the newly enrolled domain 212. The PAM enabled trust allows the SIDs 306 that were placed on the shadow principal containers (groups) 310 to flow into the newly enrolled domain 212, which enables the privileges 210 needed to perform the administrative operations.

Callout H. A read-only domain controller (RODC) 428 (e.g., Azure® RODC) feature is enrolled in the CBPAM domain 406. The RODC feature 428 enables cloud directory joined 430 admin virtual machines 416 to receive a cloud Kerberos TGT for the CBPAM domain when they authenticate (e.g., when they authenticate as admins into this Azure® environment).

Callout I. An administrative virtual desktop 416 (e.g., a Windows Virtual Admin Desktop offering of Windows Virtual Desktop) is provided. The admin virtual desktop 416 may be exclusively for administrative use, and configured for providing a highly secure, immutable administrative joined 430 (e.g., to the customer's tenant via Azure® AD) virtual desktop from where all privileged tasks can be performed. The CBPAM service provider may provide an image of such software, or a customer may upload the image to the CBPAM service provider. As an additional layer of security, access 432 to the administrative virtual desktop 416 does not use a password (e.g., RDP access to Windows Virtual Admin Desktops is configured as passwordless).

Callout J. An embodiment may provide customers with one or more of the following workstation options to manage their hybrid environment.

A first option is for the customer to purchase a PAW 414 from the CBPAM service provider (e.g., a Microsoft Managed Privileged Access Workstations (PAW)). The CBPAM service provider provides a device 102 that is joined 430, securely configured (locked down), and managed by the CBPAM service provider (e.g., via Microsoft Intune® code). The PAW image may be provided by the CBPAM service provider or customer provided. The image would include a separate cloud directory joined virtual machine for non-privileged tasks (word processing, videoconferencing, etc.). Privileged tasks would be exclusively performed from the administrative virtual desktop 416.

A second option is for the customer to provide their own corporate PAW devices, but still use the administrative virtual desktop 416 to perform privileged tasks.

A third option is for the customer to elect not to use PAW devices (e.g., due to their cost) and instead use the administrative virtual desktop 416 like a jumpbox. However, this configuration does not inherently relax the passwordless requirement on the administrative virtual desktop 416.

Potential Resource Management Workflow

As further illustration of the FIG. 4 and other CBPAM architectures, assume a user wants to perform a privileged operation in the on-premises domain 212. From their cloud directory joined 430 device (a PAW 414 or a regular workstation), they navigate to an enhanced PIM interface in their tenant (e.g., a cloud PIM code 402 interface) and submit a request for privileged access.

The enhanced PIM interface 402 audits the request and the architecture enforces 510 the rules associated with the request, e.g., as to the number of approvers.

Assuming the privileged access request meets the policy requirements configured in PIM, the request is approved.

Cloud PIM code 402 places the privileged access request in the agent 404 queue. The Hybrid PIM Agent 404 fetches the request from the agent queue. The agent conveys 434 the requesting user's bastion admin account to the designated Shadow Principal in the secure cloud shadow admin group 310, with the appropriate time-to-live (TTL) 312 per the access policy 314.

From a PAW device (if possible), the requestor opens a remote desktop connection to the administrative virtual desktop 416 pool. The requestor authenticates to the cloud directory joined virtual admin desktop using, e.g., a FIDO2 key or another form of passwordless authentication, using their CBPAM domain admin identity.

The administrative virtual desktop authenticates the user to the cloud directory (e.g., an Azure® Active Directory® offering), which provides the user with a PRT and a Cloud TGT for the CBPAM domain (e.g., an Azure® AD DS Bastion Forest). The virtual machine exchanges the Cloud TGT for a CBPAM domain TGT that contains the SIDs 306 from the Shadow Principal container (Group) 310 that will be used to perform the privileged task.

The requestor arrives at a clean, secure desktop with admin tools (e.g., Remote Admin Tools and a PowerShell® interpreter) at their disposal to perform the privileged operation. This desktop can be used to manage either cloud resources (e.g., via Azure® AD) or on-premises resources (e.g., via on on-prem AD) as the user has been authenticated to both.

When the requestor completes their task, they sign out of the administrative virtual desktop. All changed state 644 from the requestor's session is discarded 642.

When the TTL on the group membership expires, the requestor's Bastion Admin account is automatically removed from the shadow principal container (group) 310, thereby revoking the privileges they were previously granted.

Additional Observations

In some embodiments, a group's securityID is stored in an attribute (e.g., onPremSID attribute) of the cloud shadow group.

In some, a cloud shadow group does not have its group memberships synchronized. This is then a differentiator between a group principal and a shadow group principal. Thus, synchronization scope in some embodiments in unlike synchronization that may be done for purposes other than implementing CBPAM.

Distinctions may also be made between a CBPAM shadow group and other groups. In non-SCBSAG groups 436, users are explicitly added to the group object data structure. When authentication happens, the security IDs (e.g., SIDs 306) for the user and non-SCBSAG groups to which the user belongs are added to an access token. Authorization rules are evaluated against the access token, looking for the security IDs in the token and applying the configured access policy to those security IDs. In non-SCBSAG groups, a change to the user group membership is made; this is implemented by a physical change in an identity management database. The user is explicitly in the non-SCBSAG group until the user is removed from the non-SCBSAG group.

By contrast, a shadow group principal is not explicitly added to the non-privileged group. When the access token is created, the security ID of the shadow group principal (which matches the non-SCBSAG group security ID) is inserted into the access token (group membership is implied, not explicit) and has an optional, time-to-live 312 associated with that implied group membership at which time the security ID will expire and no longer provide access based on the implied membership. An on-premise domain 212 Z will recognize any group as a valid part of Domain Z if that group has a group SID that includes or otherwise sufficiently matches the Domain Z SID. In particular, in some embodiments the SIDs are identical, and therefore, Domain Z always thinks that SID is the SID which matches the group in its database.

In some embodiments, a principal is a user, a group, or any other item that has a security ID, which is a unique identity used in a security context. A domain can have three Pat Smiths, for example, so the security ID, or SID is how the authentication systems distinguish among the three. Authorization decisions also depend at least in part on a security principal. In some embodiments, a shadow security principal is a copy of a conventional security principal from another forest or domain. An embodiment may take the SID 1234-500 from Domain Z and copy it into an attribute of a shadow security principal in Domain/Forest A. Under one view, a shadow group, secure shadow group, or shadow group principal is a cloud object that represents what will be a shadow security principal in the bastion forest, as opposed to a pre-existing non-shadow group.

In some embodiments, a bastion domain such as Domain A is the clean domain 406 that is hosted in the cloud. To implement a privileged identity, an embodiment may add userA in Domain A to a member of a shadow security principal in Domain A that shares a security ID with a group from an on-premise domain 212 such as Domain Z. Domain A has a forest-level, privileged access management type trust with Domain Z. When userA would perform an action in Domain A, their authentication crosses the trust. The access token includes the shared group SID. The trust type informs Domain Z that it should allow that SID to pass through the trust, thereby allowing userA to satisfy any authorization rules for the group in Domain Z, as if userA were explicitly part of the group.

In one example scenario, Domain Z [SecurityID aka SID of 1234] has an administrative group (admin group) [SecurityID of 1234-500] that has privilege over the entire domain, which includes other groups within the domain (non-privileged group a.k.a. "np group") [SecurityID 1234-1]. The admin group and all other groups are part of Domain Z. Domain Z is provisioned on the cloud-based PAM solution 616. Part of that provisioning includes a synchronization of the admin group (and any other group within Domain Z that the admin uses or will use to grant privileges to users). The cloud then has a shadow group of domain Z's admin group (csg-admin group) [OnPremSecurityID 1234-500], and a cloud shadow group for Domain Z's non-privileged group (csg-np group) [OnPremSecurityID 1234-1]. The cloud shadow group's onPremSID is identical to Domain Z's group securityID (SID), therefore Domain Z will recognize the securityID of 1234-500 as belonging to Domain Z's admin group, and recognize securityID of 1234-1 as belonging to Domain Z's np group, and similarly recognize any other groups based on their SIDs.

Technical Character

The technical character of embodiments described herein will be apparent to one of ordinary skill in the art, and will also be apparent in several ways to a wide range of attentive readers. Some embodiments address technical activities such as synchronizing 422 with a cloud directory 412, creating 504 a cloud shadow group, copying or comparing Security IDs 306, establishing 506 a trust relationship 224 between authentication domains 214, and directing 512 an administrative action 222 from a cloud 216 toward an on-premise resource 208, each of which is an activity deeply rooted in computing technology. Some of the technical mechanisms discussed include, e.g., security identifications 306, secure shadow administrative groups 310, TTL values 312, break glass accounts 320, access policy data structures 314, enrollment request data structures 220, and admin virtual desktops 416. Some of the technical effects discussed include, e.g., just-in-time group membership 434, fostering 514 of cloud-based privileged access management 228 of on-premise resources 208, and increased security through and techniques such as avoidance 618 of compromised accounts and conformance 620 with least privilege 324 and exclusively passwordless authentication usage 636. Thus, purely mental processes are clearly excluded. Other advantages based on the technical characteristics of the teachings will also be apparent to one of skill from the description provided.

Some embodiments described herein may be viewed by some people in a broader context. For instance, concepts such as authority, control, location, and security may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to reduce maintenance burdens for privileged access management without reducing security, and how to enhance privileged access management consistency and availability. Other configured storage media, systems, and processes involving authority, control, location, or security are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples and scenarios, operating environments, attribute or entity examples, software processes, security protocols, identifiers, data structures, data formats, notations, control flows, naming conventions, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill. Trademarks and service marks noted in the following list are marks of Microsoft Corporation unless indicated otherwise.

AADJ: Azure® Active Directory® joined
AAD DS: Azure® Active Directory® domain services
AD: Active Directory®
ALU: arithmetic and logic unit
API: application program interface
BIOS: basic input/output system
CD: compact disc
CPU: central processing unit
cESAE: cloud-based enhanced security administrative environment
ESAE: enhanced security administrative environment
DVD: digital versatile disk or digital video disc
FIDO2: a Fast Identity Online (FIDO) Alliance specification
FPGA: field-programmable gate array
FPU: floating point processing unit
GPU: graphical processing unit
GUI: graphical user interface
HAADJ: hybrid Azure® Active Directory® joined
HTTPS: hypertext transfer protocol secure
IaaS or IAAS: infrastructure-as-a-service
ID: identification or identity
IoT: Internet of Things
IP: internet protocol
LAN: local area network
LDAP: lightweight directory access protocol
MMD: Microsoft managed desktop
MS: Microsoft
OS: operating system
PaaS or PAAS: platform-as-a-service
PAM: privileged access management
PAW: privileged access workstation
PIM: privileged identity management
PRT: primary refresh token
RAM: random access memory
RDP: remote desktop protocol
RODC: read-only domain controller
ROM: read only memory
SaaS: software as a service
SAW: secured admin workstation
SID: security identifier
SKU: stock keeping unit TCP: transmission control protocol
TGT: ticket-granting ticket
TPU: tensor processing unit
TTL: time-to-live
UDP: user datagram protocol
UEFI: Unified Extensible Firmware Interface
URI: uniform resource identifier
URL: uniform resource locator
VM: virtual machine
WAN: wide area network
WHFB: Windows Hello® for business
443: port 443; used by HTTPS Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

An "authentication domain" is a network or system administration specification of identities that share an authentication controller. Some example authentication domains are Windows® domains and Linux® FreeIPA domains, among others. Domains may span states, countries, regions, and other geographic areas. An "authentication controller" is a server or other system 102 that runs authentication domain software, e.g., a Windows® domain controller or a Linux® FreeIPA server (marks of Microsoft Corporation, Linus Torvalds, respectively). Domains in the Domain Name System (DNS) that serve as aliases for IP addresses are not necessarily coextensive with authentication domains.

A "policy group" is a set of identities that share an authorization policy. Some examples include Windows® groups defined using Group Policy Objects, and Linux®, Mac®, or Windows® groups defined using JumpCloud® policies, among others (marks of Microsoft Corporation, Linus Torvalds, Apple, Inc., JumpCloud, Inc., respectively). A Group Policy Objects is broadly speaking a form of authorization in that it provides settings that control what a principal can and cannot do within a system. Group policies are applied to user principals or group principals.

A "group principal" is a single identity that can represent a collection of identities (a.k.a. principals), which also can be other groups, that can be associated to an authorization policy. Group principals do not necessarily have any authorization mechanism themselves. An authorization policy is a separate entity that is linked or otherwise associated to a user principal or group principal.

A "cloud-based identity management service" includes, e.g., Windows® Azure® Active Directory® services, Amazon® AWS® Identity and Access Management services, and other services that help manage cloud user identities (marks of Microsoft Corporation, Amazon Technologies, Inc., respectively).

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Privileged access management operations such as enrolling authentication domains 212, enrolling identity groups 308, setting TTL values 312, reading and writing SIDs 306, creating SCBSAGs 310, enforcing access policies 314, providing secure management control 228 of digital resources 208, 218, and many other operations discussed herein, are understood to be inherently digital. A human mind cannot interface directly with a CPU or other processor, or with RAM or other digital storage, to read and write the necessary data to perform the cloud-based privileged access management steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accepting, authenticating, conforming, creating, directing, discarding, embedding, enforcing, ensuring, establishing, fostering, getting, identifying, making, managing, providing, receiving, restricting, securing, serving, setting, specifying, utilizing (and accepts, accepted, authenticates, authenticated, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment
- 102 computer system, also referred to as a "computational system" or "computing system", and when in a network may be referred to as a "node"
- 104 users, e.g., an analyst or admin or other user of an enhanced system 202
- 106 peripherals
- 108 network generally, including, e.g., clouds, local area networks (LANs), wide area networks (WANs), client-server networks, or networks which have at least one trust domain enforced by a domain controller, and other wired or wireless networks; these network categories may overlap, e.g., a LAN may have a domain controller and also operate as a client-server network
- 110 processor; 110 also refers to the computational activity processing
- 112 computer-readable storage medium, e.g., RAM, hard disks
- 114 removable configured computer-readable storage medium
- 116 instructions executable with processor; may be on removable storage media or in other memory (volatile or non-volatile or both)
- 118 data
- 120 kernel(s), e.g., operating system(s), BIOS, UEFI, device drivers
- 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, enhanced browsers, and so on
- 124 applications, e.g., word processors, web browsers, spreadsheets, games, email tools, commands
- 126 display screens, also referred to as "displays"
- 128 computing hardware not otherwise associated with a reference number 106, 108, 110, 112, 114
- 202 enhanced computers, e.g., computers 102 (nodes 102) enhanced with cloud-based PAM functionality
- 204 cloud-based privileged access management (PAM) functionality; also referred to as CBPAM; 204 refers to functionality which does at least one of the following: creates a secure cloud-based shadow administrating group, directs administrative action to an on-premise resource via a secure cloud-based shadow administrating group, conforms with the FIG. 4 flow diagram or the FIG. 6 flowchart or its constituent flowchart in FIG. 5, or otherwise provides capabilities first publicly taught herein
- 206 resource access; 206 refers to the activity or the capability or both
- 208 on-premise resource, e.g., data, data structure, process, processor, memory, device, API, portal, address, URL, web page, device, account, setting, default value, file, log, or other digital artifact or component of an on-premise computing system 102; may be implemented, e.g., using or relying on computational results of digital access tokens, certificates, login procedures, passwords or other pass phrases, multifactor authentication, or biometrics; "on-prem" is also used as a short form of "on-premise" or "on-premises"
- 210 privilege, e.g., right, capability, or digital artifact evidencing a right or capability in a computing system 102; may be role-based, access-based, or otherwise; may be in a discretionary access control or mandatory access control or other environment
- 212 on-premise authentication domain
- 214 authentication domain generally (on-premise or otherwise)
- 216 cloud; also referred to as "cloud computing environment"
- 218 cloud resource, e.g., data, data structure, process, processor, memory, device, API, portal, address, URL, web page, device, account, setting, default value, file, log, or other digital artifact or component of a cloud computing system 102
- 220 request for enrollment in a CBPAM service; 220 also refers to enrolling a group or domain in CPBAM or requesting such enrollment, as a computational activity
- 222 administrative action, e.g., an action which is directed at a resource in a computing system 102, and for which the computing system 102 requests or requires a privilege level that is greater than the lowest privilege level granted in the system; 222 refers to a digital data structure implementing the administrative action, and to the activity of computationally performing the action
- 224 trust relationship; may also be referred to simply as a "trust"
- 226 cloud tenant; one or more authentication domains may belong to a given tenant
- 228 resource management, or resource access management; 228 refers to the activity of managing, or to functionality for security or operational management, or to both; also described as secure management control, e.g., as control over management of access 206
- 302 interface
- 304 CBPAM software
- 306 security identification
- 308 group generally; enrollee groups are an example
- 310 secure shadow group; also referred to as "secured shadow group", "secured cloud-based shadow administrating group", "SCBSAG"
- 312 time-to-live (TTL) value
- 314 policy data structure; also referred to simply as "policy" with the understanding that a policy is a digital data structure in a computing system; some examples include access policies and group security policies, which may also be known by other names 316 communication session; also referred to as "login session"; assumes an electronic transfer of digital data
318 enrollee group info, e.g., security identification, domain, members, associated access policy
320 break glass account
322 non-compromised account; a computing system account whose login and other access credentials are possessed only by authorized users
324 least privilege criterion; a verifiable requirement that an account's holder only has privileges that are needed for the account holder's performance of tasks within their current job scope—all other privileges have been removed or revoked, or were not granted
402 cloud privileged identity management (PIM) code
404 CBPAM agent code; also referred to as "Hybrid PIM agent"
406 CBPAM authentication domain; a bastion forest is an example; also referred to as "CBPAM domain"
408 user account in a computing system; provides an authorized user with access to data 118 or computer-implemented services
410 lifespan of an authorization or an authentication
412 cloud directory, in the sense of a database or other directory of identities in a cloud computing environment; an identity is a principal or other item or artifact or entity that has a security identification
414 privileged access workstation; also referred to as a "secured admin workstation"; "PAW" and "SAW" are used as abbreviations for these items 414
416 virtual admin desktop code; also referred to as "administrative virtual desktop"; "admin" in this disclosure stands for "administrator" or "administrative" or "administration"
418 cloud directory sync code; "sync" in this disclosure stands for "synchronization"
420 cloud domain service; cloud domain service code
422 synchronization to a cloud directory 412; performed computationally and with networked communication
424 CB PIM configuration program, also referred to as "Hybrid PIM Configuration"
426 one-way sync of cloud users; performed computationally
428 read-only domain controller code
430 characteristic or activity of being joined to a cloud directory 412
432 event or activity of access to an administrative virtual desktop
434 conveyance of an admin account data structure; performed computationally; may be part of just-in-time access (JIA or JITA)
436 non-SCBSAG group; may be informally referred to as a "normal group" in contrast with a secure shadow group 310
500 flowchart; 500 also refers to CBPAM methods illustrated by or consistent with the FIG. 5 flowchart
502 get an enrollment request; performed computationally using, e.g., network communication
504 create a secure cloud shadow group; performed computationally e.g., by allocating memory 112 and placing values therein to form a SCBSAG data structure 310
506 establish a one-way trust relationship; performed computationally, e.g., by setting values in data structures that define trust relationships between authentication domains 214
508 receive an admin access request; performed computationally, e.g., via an interface 302
510 enforce an access policy; performed computationally, e.g., by parsing a policy, checking for credentials or approvals specified in the policy, and allowing or denying access 206 based on whether the policy criteria are satisfied
512 direct admin action; performed computationally, e.g., by transmitting a data structure or command over a network 108
514 foster use of only the cloud shadow group; performed computationally, e.g., by disabling or deleting data structures or interfaces that would have provided an alternative to use of the cloud shadow group
516 ensure an enrollee group is empty, or empty except for built-in or break glass accounts; performed computationally, e.g., by disabling or deleting data structures or interfaces that represent or operate non-built-in and non-break-glass accounts
518 admin access request data structure; also refers to activity of creating or sending such as data structure
520 approval criterion data structure
600 flowchart; 600 also refers to CBPAM methods illustrated by or consistent with the FIG. 6 flowchart (which incorporates the steps of FIGS. 4 and 5)
602 identify an enrollee group; performed computationally, e.g., by data structures or interfaces
604 accept login to admin account; performed computationally, e.g., by data structures or interfaces
606 include at least a portion of one security ID in another security ID; security IDs are data structures, and data structures are digital
608 have a security ID, e.g., by including the security ID or a linkage to the security ID
610 embed a domain security ID in a group security ID
612 provide secure management control; performed computationally, e.g., by data structures or interfaces; "secure" means using at least one security tool or technique discussed in the present disclosure
616 cloud service, e.g., SaaS offering, resource accessible via a cloud interface, or code executed in a cloud or a result of execution of code in a cloud
618 avoid presence of compromised account
620 conform with least privilege criterion
622 provide secure management control in an emergency, e.g., when CBPAM service is not available because the cloud is not available
624 emergency secure management control; may have a subset of the functionality of non-emergency secure management control
626 authenticate an admin user; performed computationally
628 accept an admin action description; performed computationally, e.g., by data structures or interfaces
630 admin action description data structure
632 set a TTL value; performed computationally
634 restrict admin actions; performed computationally, e.g., by data structures or interfaces
636 ensure only passwordless authentication is effective; performed computationally, e.g., by data structures or interfaces
638 direct admin action data structure at a cloud resource; performed computationally, e.g., by data structures or interfaces and with network 108
640 specify approval criterion is access policy, e.g., by setting values in data structure that implements access policy 642 discard session information, e.g., by overwriting it in memory or allowing it to be overwritten after being freed and re-allocated for other usage 644 session information 646 utilize a cloud directory; performed computationally 648 stage data while computationally configuring or providing CBPAM 650 make a user account; performed computationally 652 any step discussed in the present disclosure that has not been assigned some other reference numeral

CONCLUSION

In short, the teachings herein provide a variety of cloud-based privileged access management functionalities 204 which operate in enhanced systems 202. Cybersecurity is enhanced, with particular attention to remote management of on-premise resources 208. A secure cloud-based privileged access management (CBPAM) service 616 manages 228 on-premise resources 208. While enrolling 220 an on-premise authentication domain 212 admin group 308, a secured cloud-based shadow administrating group (SCBSAG) 310 is created 504. A SCBSAG 310 security identification 306 includes 606 at least part of the enrollee's 308, 212 security identification 306. The SCBSAG 310 belongs to a clean 618 CBPAM authentication domain 406 which may be secured by defense in depth controls such as time limits 312 on authentication 626 or authorization, password avoidance 636, least privilege 324 conformance 620, one-way syncing 426, and one-way trust 224 establishment 506. Management 228 of resources 208 via 512 the configured SCBSAG 310 may be fostered 514 by emptying 516 the on-premise admin group 308, although a break glass account 320 may be kept 622 for emergency management 624. CBPAM services 616 direct 512 administrative actions 222 toward on-premise resources 208 through SCBSAGs 310 for cloud 216 tenants 226, providing 612 secure management control 228 as a service 616, with broader geographic scope and lower maintenance burdens and costs than privileged access management approaches that are not cloud-based.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 4, 5, and 6 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific products, specific architectures, specific attributes, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A cloud-based privileged access management (CBPAM) system, comprising:
    a digital memory in a cloud; and
    a processor in operable communication with the digital memory, the processor configured to perform CBPAM steps on behalf of a tenant of the cloud, the steps including getting an enrollment request, the enrollment request identifying an enrollee group for enrollment in a CBPAM service, the enrollee group belonging to an on-premise authentication domain which includes an on-premise resource, the enrollee group having an enrollee group security identification, creating a secured cloud-based shadow administrating group (SCBSAG) which has a SCBSAG security identification that includes at least a portion of the enrollee group security identification, the SCBSAG belonging to a CBPAM authentication domain which is not the on-premise authentication domain, directing an administrative action toward the on-premise resource through the SCBSAG on behalf of the tenant and based at least in part on at least a portion of the enrollee group security identification, and establishing a solely one-way trust relationship having the CBPAM authentication domain as a trusted entity and the on-premise authentication domain as a trusting entity, the steps not necessarily performed in the order recited;
    whereby the system is configured to provide secure management control of the on-premise resource from the cloud as a service to the cloud tenant.

2. The system of claim 1, wherein the CBPAM authentication domain has a CBPAM authentication domain security identification which is embedded in the SCBSAG security identification.

3. The system of claim 1, wherein no user account of the CBPAM authentication domain is compromised and no user account of the SCBSAG is compromised.

4. The system of claim 1, wherein all user accounts of the CBPAM authentication domain conform with a least privilege criterion and all user accounts of the SCBSAG also conform with the least privilege criterion.

5. The system of claim 1, wherein the CBPAM authentication domain has a break glass account which is configured to provide emergency secure management control of the on-premise resource without use of the SCBSAG.

6. A method for providing a cloud-based privileged access management (CBPAM) service for an on-premise resource, the method comprising:
    getting an enrollment request, the enrollment request identifying an enrollee group for enrollment in the CBPAM service, the enrollee group belonging to an on-premise authentication domain which includes the on-premise resource, the enrollee group having an enrollee group security identification;
    creating a secured cloud-based shadow administrating group (SCBSAG) which has a SCBSAG security identification that includes at least a portion of the enrollee group security identification, the SCBSAG belonging to a CBPAM authentication domain which is not the on-premise authentication domain;
    directing an administrative action toward the on-premise resource through the SCBSAG based at least in part on at least a portion of the enrollee group security identification; and
    at least one of: ensuring that the enrollee group does not contain any members, or restricting administrative management of the on-premise authentication domain to administrative actions which are directed from the SCBSAG.

7. The method of claim 6, further comprising establishing a one-way trust relationship having the CBPAM authentication domain as a trusted entity and the on-premise authentication domain as a trusting entity.

8. The method of claim 6, further comprising authenticating an administrative user to the SCBSAG, and accepting a description of the administrative action from the authenticated administrative user before directing the administrative action toward the on-premise resource.

9. The method of claim 8, further comprising setting a time-to-live value for at least one of the following:
an authentication lifespan of the administrative user after which the administrative user will no longer be treated as authenticated to the SCBSAG; or
an authorization lifespan of the administrative action after which the administrative action will no longer be treated as authorized.

10. The method of claim 6, further comprising accepting a login to the administrative user account from a privileged access workstation.

11. The method of claim 6, further comprising ensuring that each successful authentication to at least one of the following is a passwordless authentication: the CBPAM authentication domain, or the SCBSAG.

12. The method of claim 6, further comprising directing another administrative action toward a cloud resource through the SCBSAG.

13. The method of claim 6, further comprising receiving an access request which requests privileged access to the on-premise resource, and enforcing an access policy against the request, the access policy specifying at least one of the following:
how many approvals are required for the access request to be granted;
a particular approval that is required for the access request to be granted;
a level of approval that is required for the access request to be granted; or
a time within which an approval is required for the access request to be granted.

14. The method of claim 6, further characterized as follows:
directing the administrative action toward the on-premise resource through the SCBSAG occurs within a login session having state information which includes at least one of the following: a session key, an access credential; and
the method further comprises discarding the state information when the login session ends.

15. The method of claim 6, further comprising utilizing a directory as an intermediate storage location for a security identification of a member of the enrollee group, the directory being managed by a cloud-based identity management service.

16. A computer-readable storage medium configured with data and instructions which upon execution by a processor cause a computing system to perform a method for providing a cloud-based privileged access management (CBPAM) service for an on-premise resource, the method comprising:
getting an enrollment request, the enrollment request identifying an enrollee group for enrollment in the CBPAM service, the enrollee group belonging to an on-premise authentication domain which includes the on-premise resource, the enrollee group having an enrollee group security identification;
creating a secured cloud-based shadow administrating group (SCBSAG) which has a SCBSAG security identification that includes at least a portion of the enrollee group security identification, the SCBSAG belonging to a CBPAM authentication domain which is not the on-premise authentication domain;
making an administrative user account in the SCBSAG; and
directing an administrative action from the administrative user account toward the on-premise resource;
whereby the method provides secure management control of the on-premise resource from the administrative user account in the cloud.

17. The storage medium of claim 16, wherein the method further comprises fostering use of only the SCBSAG for administrative management of the on-premise resource by ensuring that the enrollee group does not contain any user account that is not one of the following:
a built-in administrator account; or
a break glass account which is configured to provide emergency secure management control of the on-premise resource.

18. The storage medium of claim 16, wherein the method further comprises restricting administrative management of the on-premise resource to implement only administrative actions which are directed from the SCBSAG.

19. The storage medium of claim 16, wherein the method further comprises verifying that the administrative action or the administrative user account or both of them satisfy an access policy which requires multiple approvals, with the verifying performed before directing the administrative action toward the on-premise resource.

20. The storage medium of claim 16, wherein the method further comprises accepting a login to the administrative user account from at least one of the following:
an administrative virtual desktop;
a privileged access workstation owned by a cloud tenant; or
a privileged access workstation leased to a cloud tenant.

* * * * *